United States Patent [19]

Hosoya

[11] Patent Number: 4,467,359
[45] Date of Patent: Aug. 21, 1984

[54] HORIZONTAL SYNCHRONIZING CIRCUIT
[75] Inventor: Nobukazu Hosoya, Nara, Japan
[73] Assignee: Sanyo Electric Co., Ltd., Osaka, Japan
[21] Appl. No.: 373,496
[22] PCT Filed: Sep. 11, 1981
[86] PCT No.: PCT/JP81/00231
 § 371 Date: Apr. 15, 1982
 § 102(e) Date: Apr. 15, 1982
[51] Int. Cl.$^3$ .............................................. H04N 5/04
[52] U.S. Cl. ..................................... 358/159; 358/158
[58] Field of Search ................................ 358/158, 159

[56]  References Cited
U.S. PATENT DOCUMENTS 3,891,800 6/1975 Janssen et al. ..................... 358/159
4,024,343 5/1977 Cense et al. ......................... 358/158

Primary Examiner—Richard Murray
Attorney, Agent, or Firm—Armstrong, Nikaido, Marmelstein & Kubovcik

[57]  ABSTRACT

A horizontal synchronizing circuit for use in a television receiver set comprises a horizontal AFC circuit so designed that an output from a voltage controlled oscillator oscillating at a frequency higher than a horizontal frequency is frequency-divided to provide a frequency-divided output which is then compared in phase with a horizontal synchronizing signal, the oscillating frequency of the oscillator being controlled by a signal indicative of the result of such comparison, and a horizontal APC circuit for driving a horizontal deflection circuit in response to the phase controlled, frequency-divided output. Various pulses for control and gating functions are synthesized by combining outputs of different frequencies from a frequency divider.

8 Claims, 4 Drawing Figures

HORIZONTAL SYNCHRONIZING CIRCUIT

FIELD OF THE INVENTION

The present invention relates to a horizontal synchronizing circuit for synchronizing the horizontal deflection in a television receiver set with a horizontal synchronizing signal.

BACKGROUND ART

In general, the horizontal synchronizing circuit is a circuit designed to synchronize the horizontal deflecting operation of a television receiver set with a horizontal synchronizing signal of a television signal and is, in principle, constituted by a phase-locked loop (PLL) including series-connected phase detector, low pass filter, voltage-controlled oscillator and horizontal deflecting circuit. The phase detector serves to detect the difference in phase between the horizontal synchronizing signal and a flyback pulse generated from the horizontal deflecting circuit and to generate a voltage signal corresponding to such phase difference. This voltage signal is applied to the voltage-controlled oscillator through the low pass filter to cause the voltage-controlled oscillator to control the oscillating frequency according to the voltage signal and then to generate a pulse synchronized with the horizontal synchronizing signal. The horizontal deflecting circuit is driven in timed relation to this pulse. As a result thereof, the fly back pulse synchronized with the horizontal synchronizing signal is generated from the horizontal deflecting circuit.

In the construction described above, since the voltage-controlled oscillator can accommodate even a slight change in voltage signal from the phase detector if the low pass filter has a small time constant the oscillating frequency can be finely controlled. In other words, the oscillating frequency of the voltage controlled oscillator can satisfactorily respond to change in phase of the horizontal flyback pulse which takes place with change in brightness of the picture screen. However, since the low pass filter having a small time constant tends to permit the passage of noises which have inadvertently been outputted from the phase detector, the voltage-controlled oscillator responding to these noises generates an output signal of erroneous frequency.

Conversely, if the time constant of the low pass filter is increased, the possibility of the erroneous operation resulting from said noises can be eliminated, but it will become impossible to finely control the oscillating frequency of the voltage-controlled oscillator.

In order to obviate the above described problem, an arrangement (double PLL) wherein two PLL are connected has been proposed, and an improved version of this double PLL is disclosed, for example, in Japanese Patent Publication No. 53-15335 (corresponding to U.S. Pat. No. 3,891,800). According to Japanese Patent Publication No. 53-15335, the use of two horizontal oscillators each having a variably controlled oscillating frequency has been proposed to control the frequency of an oscillator preceding thereto in accordance with the difference in phase between an oscillating output thereof and the horizontal synchronizing signal and also to control the frequency or phase of an oscillator following thereto in accordance with the difference in phase between the oscillating output so controlled and the horizontal flyback pulse.

In such a circuit, the erroneous operation resulting from the noises contained in the horizontal synchronizing signal can be eliminated by selecting the time constant of a circuit operable to control the preceding oscillator to be of a large value and, by selecting the time constant of a circuit operable to control the following oscillator, it is possible to cope satisfactorily with change in phase of the horizontal flyback pulse which varies with change in brightness of the picture screen.

However, in the conventional circuit described above, since the two oscillator oscillate at the same frequency as that of the horizontal synchronizing signal (hereinafter, referred to as horizontal frequency), the range in which the frequency thereof can vary cannot be set to a sufficiently narrow range relative to the horizontal frequency. Because of this, in the case where a quasi-synchronizing signal having a frequency diverting from the normal horizontal frequency due to spurious interference and others is generated, there is the possibility that the horizontal synchronizing system tends to be stabilized at the diverted frequency. In addition, in the conventional circuit described above, as a method for controlling the following oscillator, there is employed a method wherein the horizontal flyback pulse is integrated to give a sawtooth voltage signal which is in turn supplied to a delay element to make a delay corresponding substantially to half the horizontal scanning period, the delayed voltage signal being used as a reference voltage signal to the phase detector. According to this method, the phase comparator is complicated in construction and, in addition, the delay element is not suited for the production in an IC.

The present invention has been developed with these points taken in consideration and has for its first object to provide a horizontal synchronizing circuit with a variable frequency oscillator capable of oscillating at a frequency sufficiently higher than the horizontal frequency which is utilized to avoid any possible erroneous operation of the horizontal deflection circuit which would result from the quasi-synchronizing signal due to the spurious interference, etc.

A second object of the present invention is to provide a horizontal synchronizing circuit wherein the output from said variable frequency oscillator is frequency-divided to enable a pulse located intermediately of the horizontal scanning period to be generated without the delay element being used, so that the timing at which the horizontal deflection circuit is to be driven can easily be controlled.

A third object the present invention is to provide a horizontal synchronizing circuit wherein a first gating pulse of a pulse width including the horizontal synchronizing pulse period is synthesized by the utilization of the output from said variable frequency oscillator, a horizontal synchronizing pulse gated by this gating pulse being so supplied to the phase detector as a reference input that, even when a so-called video-in-sink wherein a video signal component of a television signal received is swept into the side of a synchronizing signal occurs, it will not be regarded as a horizontal synchronizing signal.

A fourth object of the present invention is to provide a horizontal synchronizing circuit wherein a second gating pulse generated only during the burst gating period is synthesized by the utilization of the output from the variable frequency oscillator, a horizontal synchronizing pulse gated by the pulse which is an inversion of this gating pulse being so supplied to the phase detector as a reference input that any possible erroneous operation resulting from noises carried on a back porch of the horizontal synchronizing signal can be eliminated.

A fifth object of the present invention is to provide a horizontal synchronizing circuit which is simple in structure and can easily be manufactured in an IC.

DISCLOSURE OF THE INVENTION

In order to accomplish the above described objects, the horizontal synchronizing circuit of the present invention comprises a variable frequency oscillator capable of oscillating a first series of pulses having a frequency about n times the frequency of the horizontal synchronizing signal (horizontal frequency) (wherein n is an integer), a frequency divider capable of generating a second series of pulses of a frequency equal to the frequency of the first series of pulses divided by n and a first phase detector for comparing the phase of the second series of pulses with the phase of the horizontal synchronizing signal and for generating a first phase difference signal corresponding to the phase difference, said variable frequency oscillator being controlled by said first phase difference signal to make the frequency of the first series of pulses equal to a value n times the horizontal frequency.

A horizontal APC circuit comprises a horizontal deflection circuit capable of generating a horizontal flyback pulse, a second phase detector for comparing the phase of the horizontal flyback pulse with the phase of the second series of pulses and for generating a second phase difference signal corresponding to the phase difference, and a control means for controlling the driving timing of the horizontal deflection circuit by the second phase difference signal, the phase of horizontal deflecting operation being synchronized with the horizontal synchronizing signal.

The horizontal synchronizing circuit of the present invention is such that the oscillating frequency of the variable frequency oscillator is selected to be of a value higher than the horizontal frequency, and therefore the frequency variable range of an output from the frequency divider can be sufficiently narrowed relative to the horizontal frequency. Accordingly, there is no erroneous operation which would result from the pseudo-synchronizing signal due to the spurious interference, etc.

In a preferred embodiment, the first phase detector comprises a first AND gate means for generating a first phase during a period in which both of the first series of pulses and the horizontal synchronizing pulse appear, a second AND gate means for generating a second pulse during a period in which both of the second series of pulse, which have been inverted, and the horizontal synchronizing pulse appear, and a first converter for converting the difference in pulse width between the first and second pulses into a voltage and for generating, as an output signal, the first phase difference signal corresponding to the voltage difference.

The first phase generated from the first AND gate means is a pulse which steps up in synchronism with the step-up of the positive horizontal synchronizing pulse and steps down at the imaginary point determined hypothetically by the frequency divider in correspondence with the central point of the horizontal synchronizing pulse, whereas the second pulse generated from the second AND gate means is a pulse which steps up at said imaginary point and steps down in synchronism with the step-down of the horizontal synchronizing pulse. By converting the difference in pulse width between the first and second pulses into an electric voltage and utilizing this voltage to control the oscillating frequency of the variable frequency oscillator to make the pulse widths of the respective first and second pulses equal to each other, it is possible to align said imaginary point with the central point of the horizontal synchronizing pulse and, hence, to render the frequency of the first series of pulses to be equal to a value n times the frequency of the horizontal frequency. In this example, the oscillating frequency of the variable frequency oscillator is adjusted with reference to the horizontal synchronizing pulse.

In another preferred embodiment, the frequency divider has a plurality of output terminals from which respective pulses formed by dividing the output of the variable frequency oscillator by $2^1$, $2^2$, $2^3$, $2^4$ and $2^5$ emerge.

In a further preferred embodiment, the second phase detector comprises a first pulse generating means for generating a control pulse of a frequency equal to the horizontal frequency in combination with the output of the frequency divider, a third AND gate means for generating a third pulse during a period in which both of said control pulse and the horizontal flyback pulse appear, a fourth AND gate means for generating a fourth pulse during a period in which both of the control pulse, which has been inverted, and the horizontal flyback pulse appear, and a second converter for converting the difference in pulse width between the third and fourth pulses into an electrical voltage and for generating, as an output signal, the second phase difference signal corresponding to the voltage.

The third pulse generated from the third AND gate means is a pulse which steps up in synchronism with the step-up of the positive horizontal flyback pulse and step down at a predetermined point determined by the frequency divider in correspondence with the central point of the flyback pulse, whereas the fourth pulse generated from the fourth AND gate means is a pulse which steps up at said predetermined point and steps down in synchronism with the step-down of the flyback pulse. By converting the difference in pulse width between the third and fourth pulses into the electrical voltage and utilizing such voltage to control the phase of the horizontal flyback pulse to render the pulse widths of the respective third and fourth pulses to be equal to each other, it is possible to align the central point of the actual flyback pulse with the predetermined point and, hence, to synchronize the horizontal flyback pulse with the horizontal synchronizing pulse. In this example, the driving timing of the horizontal deflection circuit is adjusted by controlling the phase of the oscillating signal from the variable frequency oscillator which has been adjusted by the previously described horizontal APC circuit.

In a still further preferred embodiment, the control means provided in the horizontal APC circuit comprises a low pass filter for converting the second phase difference signal into a direct current signal, a fifth AND gate means for generating a fifth pulse at a predetermined position intermediately of the horizontal scanning period (the pulse duration of the horizontal synchronizing pulse) in combination with the output from the frequency divider, an integrating means for integrating a predetermined voltage in response to the fifth pulse and for generating an integrated value, and a comparator means for comparing the second phase difference signal, which has been converted into the direct current signal by the low pass filter, and the integrated value generated from the integrating means, the horizontal deflection circuit being driven when the integrated value exceeds the second phase difference signal. The flyback pulse is generated from this horizontal deflection circuit.

In a still further preferred embodiment, there is further provided with a discriminating means for discriminating whether or not said horizontal flyback pulse is synchronized with the horizontal synchronizing pulse.

In a still further preferred embodiment, there is further provided with a sixth AND gate means for generating a sixth pulse having a pulse width including the pulse duration of the first pulse in combination with the output from the frequency divider, a seventh AND gate means for generating a seventh pulse having a pulse width including the pulse duration of the second pulse in combination with the output from the frequency divider, an eighth AND gate means for deriving a logical product of the sixth pulse and the horizontal synchronizing signal when the discriminating means has discriminated the synchronized state and for supplying the logical product as one input to the first gate means which also receives as another input the first series of pulses, and a ninth gate means for deriving a logical product of the seventh pulse and the horizontal synchronizing signal when the discriminating means has discriminated the synchronized state and for supplying the logical product as one input to the second AND gate means which also receives the second series of pulses as another input.

The sixth to ninth gate means are provided for preventing the video signal component of a composite video signal from appearing in the first and second pulses is the form of a pseudo-synchronizing signal as a result of the so-called video-in-sink.

In a still further preferred embodiment, a second pulse generating means for generating a gating pulse which steps down substantially simultaneously with the stepdown of the positive horizontal synchronizing pulse in combination with the output from the frequency divider and steps up after the lapse of a predetermined time, and a tenth AND gate means for deriving a logical product of the gating pulse and the horizontal synchronizing signal and for supplying the logical product output as one input to the discriminating means which also receives the horizontal flyback pulse as another input are further provided.

The second pulse generating means and the tenth AND gate means are provided for avoiding the noises riding on a back porch of the horizontal synchronizing signal.

BEST MODE FOR CARRYING OUT THE INVENTION

Figure 1:
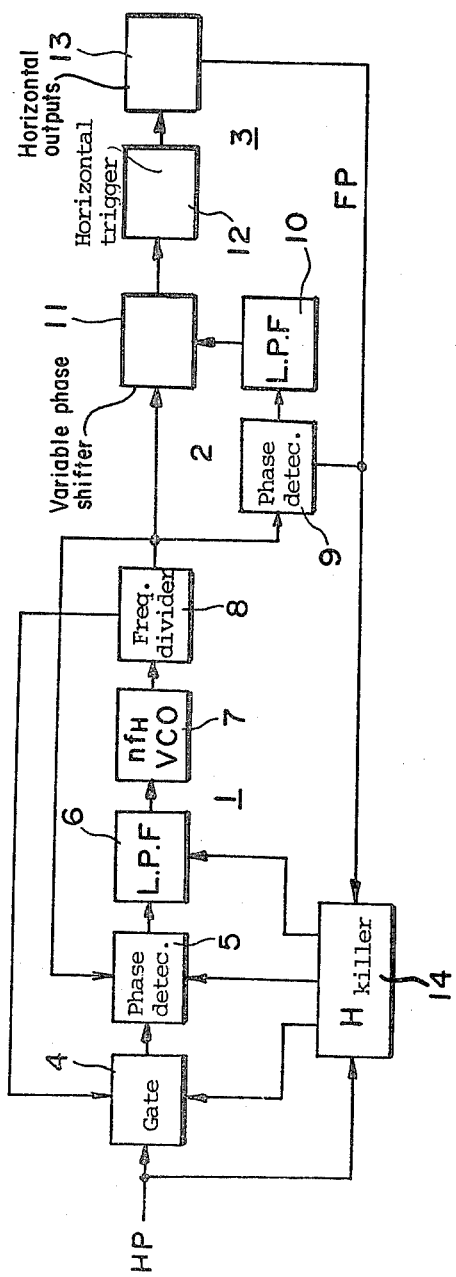
FIG. 1 is a block diagram showing a basic arrangement of a horizontal synchronizing circuit according to the present invention.

FIG. 1 illustrates a block wiring diagram showing a horizontal synchronizing circuit according to the present invention in this figure, 1 is an AFC (automatic frequency control) circuit, 2 is an APC (automatic phase control) circuit, and 3 is a horizontal deflecting section.

The AFC circuit 1 basically comprises a gating circuit 4 for allowing the passage of an output from a synchro separator circuit not shown for a short period of time including the period of a horizontal synchronizing pulse, a first phase detecting circuit 5 for detecting the phase difference between a horizontal synchronizing pulse HP derived from this gating circuit and an output pulse from a frequency dividing circuit as will be described later, a first low pass filter 6 for converting the detected phase difference into a voltage and for smoothing the converted voltage, a VCO (voltage controlled oscillator) 7 for generating a series of pulses at a frequency controlled by a direct current voltage obtained from this filter, and a frequency dividing circuit 8 for frequency-dividing the series of pulses. It is here to be noted that the oscillating frequency of the VCO 7 is selected to be of a value approximately n(integer) times the frequency fH of the horizontal synchronizing signal of a television signal and that a pulse obtained by dividing the frequency of the series of pulses by n in the frequency divider 8 is introduced to the first phase detecting circuit 5.

On the other hand, the APC circuit 2 comprises a second phase detecting circuit 9 for detecting the phase difference betwee the (1/n) frequency divided pulse from the frequency dividing circuit 8 and a flyback pulse FP derived from a horizontal output circuit 13 in the horizontal deflecting section 3, a second low pass filter 10 for converting the detected phase difference in a voltage and for smoothing the converted voltage, and a variable phase shifting circuit 11 for varying the phase of the (1/n) frequency-divided pulse according to the direct current obtained from the filter 10 and introducing it to a horizontal trigger circuit 12 in the horizontal deflecting section 3. It is to be noted that the time constant of the second low pass filter 10 is selected to be sufficiently smaller than that of the previously described first low pass filter 6.

14 is a circuit for discriminating whether or not the horizontal synchronizing pulse HP and the horizontal flyback pulse FP are in a synchronized state and for effecting the switching of the gating circuit 4 between operative and inoperative positions, the change of the detecting sensitivity of the first phase detecting circuit 5 and the change of the time constant of the first low pass filter 6 according to the result of the discrimination. In the present invention, this circuit is referred to as an H killer circuit 14.

Although the killer circuit 14 is operable to effect the various switching operations described above, the switching of the gating circuit 4 will first be described. When the gating circuit 4 is in the operative position, it will open not only during a period in which the horizontal synchronizing pulse exists, but also during a period in which no pulse exist, thereby allowing the passage of the horizontal synchronizing signal HP from the synchro separating circuit and, on the other hand, when it is in the inoperative position, it will open during a period in which the horizontal synchronizing pulse is supposed to exist and close during a period in which no pulse exist, that is, during the interval between the neighboring pulses. By so doing, any possible erroneous operation resulting from the video-in-sink can be eliminated. In other words, since a video signal is derived from the synchro separating circuit in the event of the so-called video-in-sink in which a video signal component of a television signal received is swept into the side of the synchronizing signal because of, for example, transmission distortion, etc., the AFC circuit 1 is erroneously operated by such video signal. Accordingly, in order to eliminate this erroneous operation, it is advisable to effect the gating to the output of the synchro separating circuit in such a way to allow the passage of such output only during the period of the horizontal synchronizing pulse. For this purpose, the gating circuit 4 is so made as to operate only in the synchronized state during which such a gate pulse (in practice, corresponding to a short period including the period of the horizontal synchronizing pulse and periods preceding and following it as provided with a latitude) can be easily obtained. In this case, the gate pulse is synthesized by the frequency dividing circuit 8.

In the next place, the change of the detecting sensitivity of the first phase detecting circuit 5 and the change of the time constant of the first low pass filter 6 will be described. If the sensitivity of the first phase detecting circuit 5 is increased and the time constant of the first low pass filter 6 is decreased, the AFC circuit 1 tends to be erroneously operated under the influence of noises (especially when in a weak electricalfield) appearing adjacent the horizontal synchronizing pulse. Therefore, in order to avoid this erroneous operation, the above described sensitivity can not be set to a high value and the time constant must be selected to be of a relatively high value. However, this in turn results in that a relatively long time will be required to establish the synchronization from the non-synchronized state which occurs at the time of initiation of the electrical power supply and the channel switch over. For this reason, change is effected in such a way that the detecting sensitivity is low with the increased time constant during the synchronized state.

The reason that the time constant of the second low pass filter is selected to be of a sufficiently small value is that, since the APC circuit 2 is considered substantially free from any influence brought by the previously described noises, this APC circuit 2 can sufficiently follow the change in phase of the flyback pulse which varies with change in brightness of the picture screen.

The horizontal trigger circuit 12 is operable to convert an output pulse from the variable phase shifting circuit 11 into a pulse width suited for driving the horizontal output circuit 13.

Figure 2:
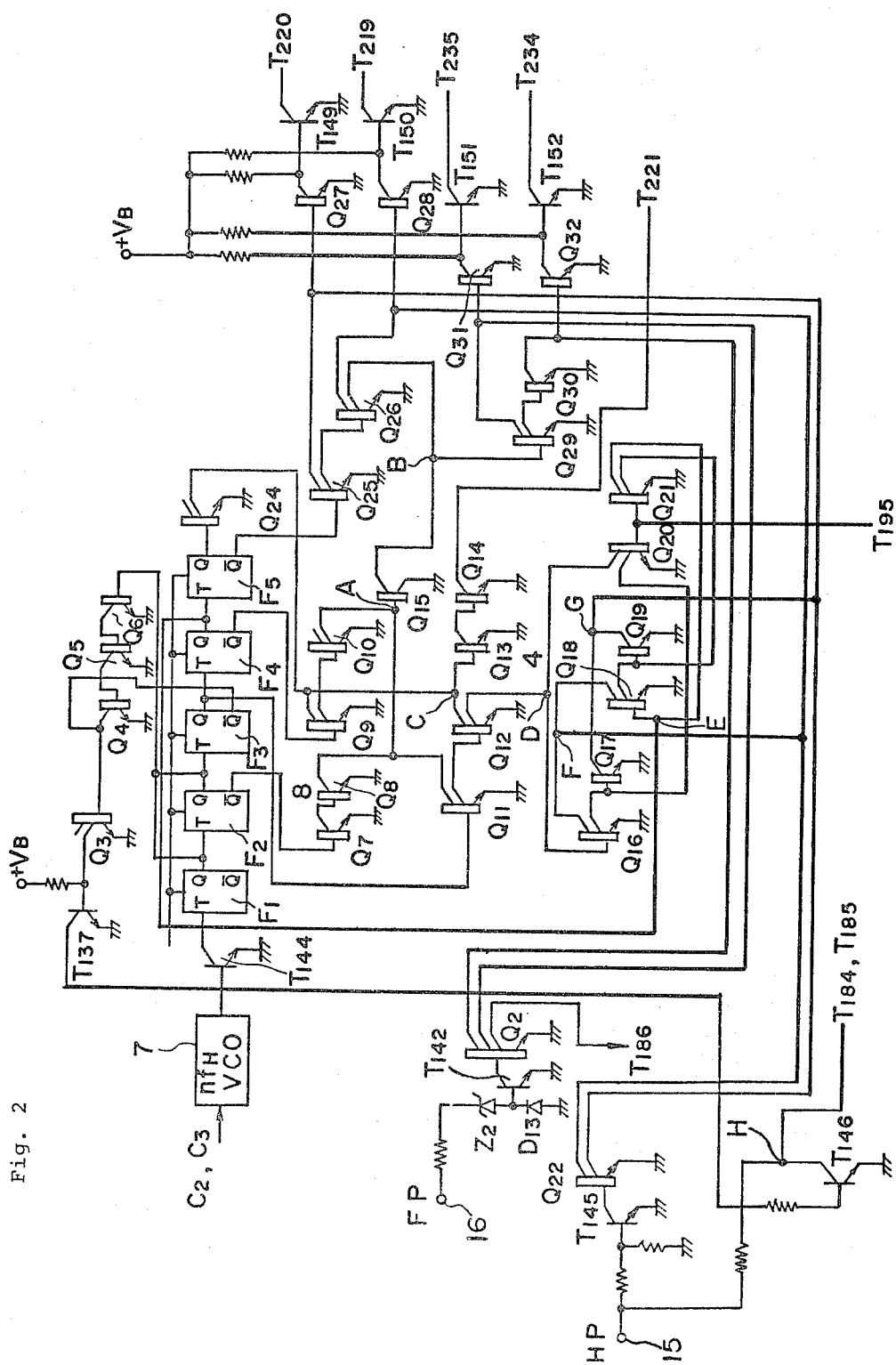
FIGS. 2 and 3 are circuit diagrams showing the details of an embodiment thereof.
Figure 3:
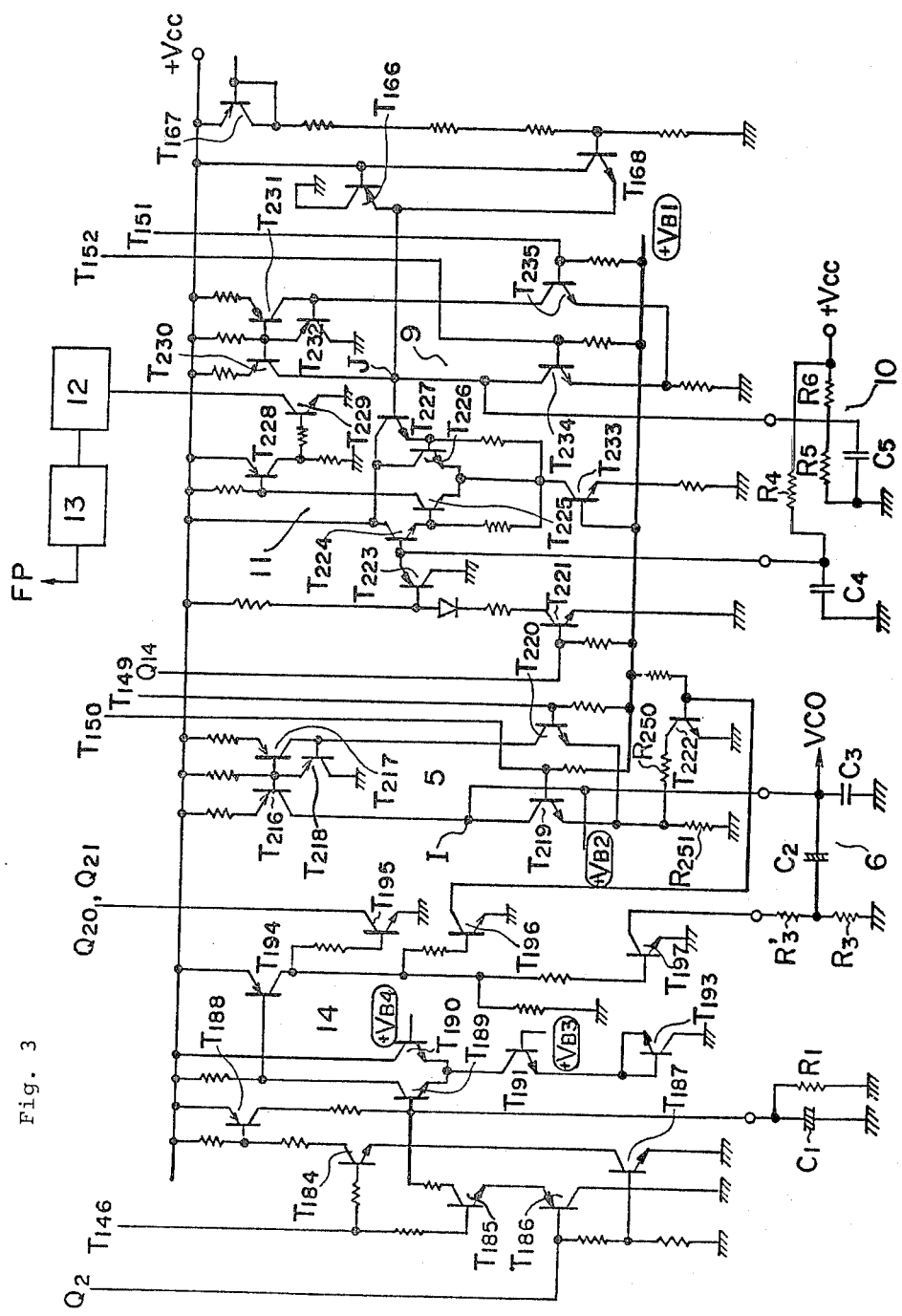

FIGS. 2 and 3 illustrate an embodiment of such horizontal synchronizing circuit and like parts shown in FIG. 1 are designated by like reference numerals. Referring first to FIG. 2, the oscillating frequency of the VOC 7 is selected to be about 32 fH (Center Frequency: 503,49643 KHz) and, accordingly, the frequency dividing circuit 8 is basically constructed in the form of (1/32) frequency dividing circuit comprised of five T flip-flops F1~F5 for sequentially frequency-dividing the above described oscillating output.

The (1/32) frequency-divided output (Frequency: about 1 fH) from the frequency dividing circuit 8, that is, the $\overline{Q}$ output of the flip-flop F5 is applied to the respective bases of elements Q27 and Q28 after having been inverted by an element Q25 or elements Q25 and Q26 of semiconductor elements Q7 to Q32 which are referred to as I²L and act as an inverter.

On the other hand, the horizontal synchronizing pulse HP derived from the synchro separating circuit (not shown) is applied from a terminal 15, shown at the left-hand portion of the figure to the respective bases of the elements Q27 and Q28 after having been inverted by transistor T145 and the element Q22.

Figure 4:
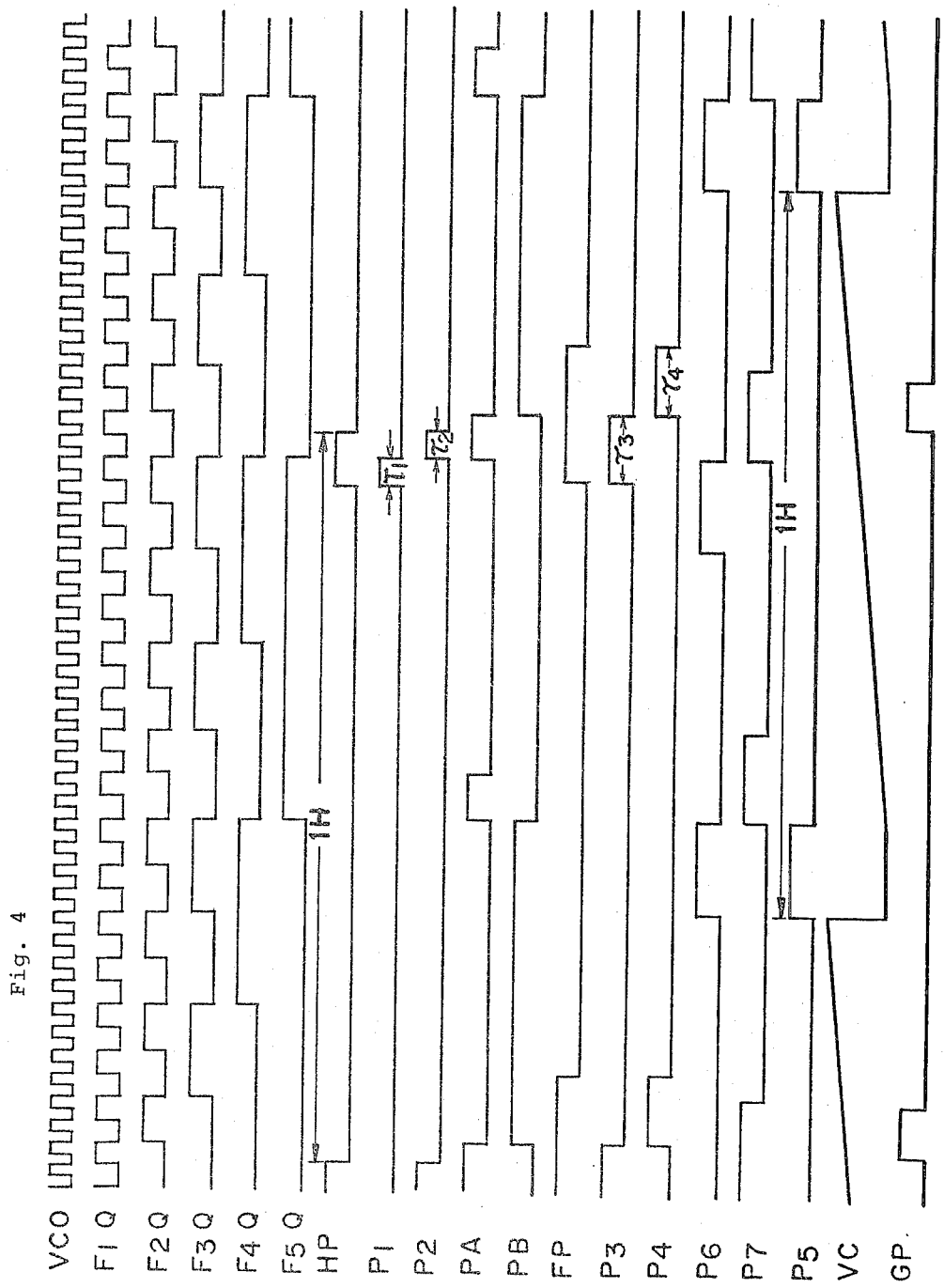
FIG. 4 is a diagram showing wave forms of signals appearing at major points of the circuits shown in FIGS. 2 and 3.

Accordingly, as can be seen from the time chart of FIG. 4, a logical product of the Q output of the flip-flop F5 and the horizontal synchronizing pulse HP or pulses P1 and P2 corresponding to the logical product of the $\overline{Q}$ output of the flip-flop F5 and the horizontal synchronizing pulse appear at the respective bases of the elements Q27 and Q28 and each of these pulses is derived after having passed through the element Q27 and a transistor T149 or through the element Q28 and a transistor T150. These pulses P1 and P2 are then supplied to the first phase detecting circuit 5.

The gating circuit 4 for the horizontal synchronizing pulse HP as described with reference to FIG. 1 is constituted by the elements Q11 to Q12 and this will be described later.

The $\overline{Q}$ output from the flip-flop F2 of the frequency dividing circuit 8 is, after having been inverted by the elements Q7 and Q8, supplied to a point A, whereas the Q output from the flip-flop F3 and the $\overline{Q}$ output from the flip-flop F4 are, after having been inverted by the element Q11 and the elements Q9 and Q10, respectively supplied to the point A. Because of this, at the point A, a pulse PA corresponding to the logical products of the $\overline{Q}$ outputs from the flip-flops F2, F3 and F4 (which logical products are hereinafter referred to as $\overline{F2}$, $\overline{F3}$ and $\overline{F4}$) appear. On the other hand, the $\overline{Q}$ output from the flip-flop F5 is, after having been inverted by the elements Q25 and Q26, supplied to a point B and is taken into a logical product with the pulse at the point A which has been inverted by the element Q15. Accordingly, after all, a pulse corresponding to F2, F3, F4 and $\overline{F5}$ appears at the point B, which pulse is supplied to the respective bases of the elements Q3 and Q32 through the element 29 or the elements Q29 and Q30.

On the other hand, the horizontal flyback pulse FP derived from the horizontal output circuit 13 shown in FIG. 3 is supplied to a terminal 16 and is, after having been shaped by a Zener diode Z2 and a diode D13, supplied to the respective bases of the elements Q31 and Q32 through a transistor T142 and an element Q2.

Accordingly, a logical product of the inverted output of the pulse at the point B and the flyback pulse FP, or pulses P3 and P4 corresponding to the logical product of the pulse at the point B and the flyback pulse FP appear at the base of the element Q31, each of which pulses are in turn, derived after having passed through the element Q31, the transistor T151 or the element Q32, and the transistor T152. These pulses P3 and P4 are in turn supplied to the second phase detecting circuit 9 shown in FIG. 3.

Moreover, the $\overline{Q}$ from the flip-flop F4 of the frequency dividing circuit F4 is, after having been inverted, derived to a point C whereas the Q output from the flip-flop F3 and the Q output from the flip-flop F5 are, after having been inverted by the elements Q11 and Q12 and by the element Q24, respectively, supplied to the point C. Because of this, a pulse P5 of horizontal cycle corresponding to F4, F3 and $\overline{F5}$ appears at the point C, which is in turn supplied to the variable phase shifting circuit 11 of FIG. 3 through the elements Q13 and Q14.

Referring still to FIG. 3, the first phase detecting circuit 5 includes, as its essential component parts, transistors T220 and T221 having their bases adapted to receive the pulses P1 and P2 derived from the transistors T149 and T150 shown in FIG. 2, transistors T216 to T218 connected on the collector sides thereof and constituting a current Miller circuit, and a transistor T222 for switching the detecting sensitivity. And to this first phase detecting circuit 5 is connected the first low pass filter 6 constituted by capacitors C2 and C3 and a resistor R3, a voltage which has been smoothed by this filter 6 being supplied to the VOC 7 shown in FIG. 2 as a control voltage.

Similarly, the second phase detecting circuit 9 includes, as its essential component parts, transistors T235 and T234 having their bases adapted to receive, respectively, the pulses P3 and P4 derived from the transistors T151 and T152 shown in FIG. 2 and transistor T230 to T232 constituting a current Miller circuit, and to this second phase detecting circuit 9 is connected the second low pass filter 10 comprised of a capacitor C5 and resistors R5 and R6. A voltage smoothed by this filter 10 is in turn supplied to the base of the transistor T272 at the right-hand portion of the variable phase shifting circuit 11 as will be described later.

It is to be noted that transistors T166 and T168 shown at the right-hand portion of FIG. 3 act as a limited for limiting the change of the potential at a point J in the second phase detecting circuit 9 to a value within a predetermined range.

The variable phase shifting circuit 11 includes, as its essential component parts, a transistor T221 having its base adapted to receive the pulse P5 of horizontal cycle derived from the element Q1 shown in FIG. 2, a transistor T223 operable in response to the transistor T221 to initiate selectively the charging and discharging of a capacitor C4 for synthesizing a sawtooth wave voltage in cooperation with a resistor R4, transistors T224 to T227 constituting a comparing circuit for comparing the sawtooth wave voltage appearing at the emitter of the transistor T223 with the direct current voltage obtained from the second low pass filter 10, and transistor T228 and T229 for drawing an output pulse from the comparing circuit and supplying it to the horizontal trigger circuit 12.

The H killer circuit 14 includes, as its essential component parts, transistors T184 and T185 having their respective bases adapted to receive the point H a logical product of the positive horizontal synchronizing pulse HP from the terminal 15 shown in FIG. 2 and the burst gating pulse GP (see FIG. 4) which has been synthesized by the element Q3 to Q4 shown in FIG. 2 and which has been inverted by the transistor T146, a transistor T186 cascade-connected with the transistor T185 and having its base adapted to receive the horizontal flyback pulse FP from the terminal 16 shown in FIG. 16, transistors T189 to T194 constituting a comparing circuit for comparing a voltage, obtained by smoothing a pulse appearing at the collector of the transistor T185 by the capacitor C1 and the resistor R1 with the predetermined direct current voltage, and switching transistors T195 to T197 responsive to an output voltage from this comparing circuit. The switching transistor T195 is connected to a common junction of the bases of the elements Q21 and Q22 shown in FIG. 2 for switching the gating circuit between operative and inoperative positions. The transistor T196 is connected to the base of the transistor T222 for changing the sensitivity of the first phase detecting circuit 5. Furthermore, the transistor T197 is operable to change the time constant of the first low pass filter 6 and for connecting a resistor R3' between the ground and a point of connection between the capacitor C2 and the resistor R3.

It is to be noted that the reason that the horizontal synchronizing pulse HP is, after having been gated by the inverted output of the burst gating pulse GP, supplied to the H killer circuit is to avoid any possible erroneous operation of the H killer circuit which would occur under the influence of the noises appearing at the back porch of the horizontal synchronizing signal.

While the embodiment of the present invention is constructed such as hereinbefore described, the operation thereof will now be described.

(1) AFC Operation the transistor T220 and T219 of the first phase detecting circuit are switched off so long as the pulses P1 and P2 are not applied, but are switched on when they are applied to pass collector currents therethrough, respectively. At this time, since the transistors T216 to T218 constitute the current Miller circuit, assuming that the amount of the collector current of the transistor T219 is i, a current of the same amount flows to the transistor T216.

The pulse width $\tau_1$ and $\tau_2$ of the respective pulses P1 and P2 are, as can be seen from FIG. 4, equal to each other during the cynchronized state, i.e., during the condition in which the step-down of the (1/32) frequency-divided output (the Q output from the flip-flop F5) of the frequency dividing circuit 8 correspond just to the center of the horizontal synchronizing pulse HP. If the phase of the frequency-divided output deviates from this condition, $\tau_1 < \tau_2$ (in case of leftward deviation) or $\tau_1 < \tau_2$ (in case of rightward deviation) depending on the leftward or rightward direction of the deviation as viewed in FIG. 4.

Accordingly, since the capacitors C2 and C3 are charged with, or discharge, a voltage corresponding to the difference between the amount of the current ($i \times \tau_1$) flowing to the point I and the amount of the current ($i \times \tau_2$) flowing from the point I, the potential at the point I increases or decreases as a result thereof, and the VCO7 shown in FIG. 2 is controlled according to the potential at the point I. Since $\tau_1 = \tau_2$, that is, both of the amounts of the currents become equal to each other during the synchronized state, the AFC system can be stabilized with the potential at the point I maintained at a predetermined value.

(II) APC Operation

The operation of the second phase detecting circuit 9 is substantially similar to that of the first phase detecting circuit 5. Accordingly, the potential at the point J increases or decreases according to the pulse width $\tau_3$ and $\tau_4$ of the respective pulses P3 and P4 (See FIG. 4) derived from the transistors T151 and T152 shown in FIG. 2, that is, the difference in phase between the horizontal flyback pulse FP and a pulse PB appearing at the point B in the frequency dividing circuit 8, and the base potential of the transistor T227 of the variable phase shifting circuit 11 varies according to the potential at this point J.

On the other hand, the transistor T222 of the variable phase shifting circuit 11 is switched on only when the pulse P5 appearing at the collector of the element Q14 of FIG. 2 and, during the conduction of this transistor T221, the transistor T223 is conducting. Accordingly, the capacitor C4 for the synthesis of the sawtooth wave voltage is charged with a power source voltage +Vcc through the resistor R4 during the switching-off of the transistor T223 and discharges during the switching-on of the transistor T223. Thereby, the sawtooth wave voltage shown by VC in FIG. 4 is generated at the emitter of the transistor T223 and is then applied to the base of the transistor T224.

Accordingly, the transistors T224 and T225 of the phase shifting circuit 11 are switched on only during a period in which the sawtooth wave voltage VC exceeds the voltage at the point J of the second phase detecting circuit 9 which is to be supplied to the base of the transistors T227, the transistor T228 being switched on during the conduction of the transistor T225. Thereby, the transistor T229 is switched on to supply the current to the horizontal trigger circuit 12 to drive this horizontal trigger circuit 12. In other words, the variable phase shifting circuit 11 determines the driving timing of the horizontal trigger circuit 12 which is when the transistor T229 is switched on. Because of this, where the horizontal flyback pulse FP and the output from the frequency dividing circuit 8 are displaced in phase, the base potential of the transistor T227 changes, resulting in change of the above described driving timing. During the synchronized state, the base potential of the transistor T227 is maintained at a value approximately equal to half the sawtooth wave voltage, with the APC operation consequently stabilized.

(III)H Killer Operation

Since the positive horizontal flyback pulse FP from the element Q2 is supplied to the base of the transistor T186 of the H killer circuit 14 as hereinbefore described, this transistor T186 is switched off during the flyback pulse period, thereby switching off the transistor T185. In addition, the transistor 187 is also switched on by the horizontal flyback pulse FP. On the other hand, to the bases of the transistors T184 and T185, the horizontal synchronizing pulse HP which has been gated by the burst gating pulse GP which was inverted is supplied from the transistor T146 (point H). Because of this, only when the pulses HP and FP coincide in timing, the transistors T184 and T187 are simultaneously switched on and, accordingly, the transistor T188 is switched on during this period to supply a charging current to the capacitor C1. Although the capacitor C1 discharges through the resistor R1, since the coincidence of the pulses HP and FP takes place repeatedly, the base potential of the transistor T189 increases and subsequently exceeds over the base potential of the transistor T190 which is maintained at a predetermined value. Therefore, the transistor T189 is switched on and the transistor T194 is also switched on, whereby the switching transistors T195 to T197 are respectively switched on.

Since the elements Q20 and Q21 in the gating circuit 4 shown in FIG. 2 have their bases connected to ground when the switching transistor T195 is switched on, collector points D and F of the respective elements Q20 and Q21 become high levels. Because of this, the Q output supplied to the point D from F3 of the frequency dividing circuit 8 through the elements Q11 and Q12 are supplied to the base of the element Q16, whereas the Q output supplied to the point E from the flip-flop F4 is supplied to the base of the element Q18. Therefore, a pulse P6 corresponding to F3·F4 and a pulse P7 corresponding to F3·F̄4 appear at the points F and G, respectively, and a logical product of these pulses P6 and P7 (See FIG. 4) and the horizontal synchronizing pulse HP which has been passed through the element Q22 takes place at the collector of the element Q22. This means that the horizontal synchronizing pulse derived to the first phase detecting circuit 5 is gated during a short period of time including the horizontal synchronizing pulse period and periods preceding and following it and, therefore, any possible erroneous operation of the AFC circuit which would result from the video-in-sink described with reference to FIG. 1 can be eliminated.

It is to be noted that, since the transistor T186 is switched on during a period other than the horizontal flyback period, when noises are applied to the transistor T184 and T185, the transistor T185 is switched on by that noises. Therefore, the capacitor C1 discharges through the transistors T185 and T186. In view of this, even if the noises admix during the pulse period of the horizontal synchronizing pulse HP, no H killer is erroneously operated by such noises.

In addition, since the transistor T222 of the first phase detecting circuit 5 is switched off when the switching transistor T196 is switched on, the resistor R250 connected in parallel to the resistor R251 is electrically isolated. For this reason, respective load resistances of the emitters of the transistors T219 and T220 increase and, accordingly, during the synchronized state, the currents flowing through the transistors T216 and T219 become small as compared with that during the non-synchronized state, resulting in that the charging and discharging currents of the capacitors C2 and C3 become low, respectively. This means the reduction of the detecting sensitivity during the synchronized state, whereby the erroneous operation of the AFC circuit caused by the noises can be eliminated.

Further, when the switching transistor T197 is switched on, the resistor R3' is connected in parallel with the resistor R3 of the first low pass filter 6. Because of this, the capacitance of the capacitor C2 apparently becomes larger than during the synchronized state and, therefore, change of the potential (signal level to be applied to VCO) at the point I becomes small. That is to say, the responsivity of the signal level to be applied to the voltage controlled oscillator VCO varies depending on whether the resistor R3' is connected in parallel or series with the resistor R3 and, in the case where not connected in parallel therewith, it becomes the sum of the voltage drop across the capacitor and the voltage drop across the resistor R3 whereas, in the case where the resistor R3' is connected in parallel therewith, it becomes the sum of the voltage drop across the capacitor C2 and the voltage drop across the parallel connected resistors R3 and R3'. Since $R3 > R3 \cdot R3'/(R3+R3')$ the latter results in the reduction of the responsivity of the signal level to be supplied to the voltage controlled oscillator VCO. This means the increased time constant of the first low pass filter 6 during the sunchronized state and, therefore, the possibility of the AFC circuit responding to the noise in the weak electrical field can be eliminated.

As hereinbefore described, since the horizontal synchronizing circuit according to the present invention is provided with the variable frequency oscillator capable of oscillating at a frequency sufficiently higher than the horizontal frequency of a television receiver, the oscillating frequency of which oscillator is controlled (AFC control) in reference to the horizontal synchronizing signal while the phase of the output from the frequency dividing circuit for frequency-dividing the output from the oscillator is controlled (APC control) according to the change in phase of the horizontal flyback pulse so that the controlled signal can be supplied to the horizontal deflecting circuit, no erroneous operation due to the noise during the weak electrical field take place and the horizontal deflecting operation can accurately be synchronized with the horizontal synchronizing signal without being adversely affected by change in brightness of the picture screen. In addition, since the oscillating frequency of the oscillator is selected to be higher than the horizontal frequency as hereinabove described, the range of variation of the frequency of the output from the frequency dividing circuit can sufficiently be narrowed and, therefore, no erroneous operation due to the pseudo synchronizing signal resulting from the spurious interference take place. Moreover, since the output from the frequency dividing circuit is used to effect the AFC operation and the APC operation, the direct comparison in phase of, for example, the pulses or the synthesis of the sawtooth wave voltage for the phase comparison can be easily done and, therefore, the phase comparing circuit can be realized in a very simplified structure and easily made in the form of an IC.

Since the present invention has satisfactorily been described in connection with the preferred embodiment, various changes and modifications are apparent to those skilled in the art and, therefore, the present invention should not be limited to the above described embodiment, but is to be construed by the appended claims.

I claim:

1. A horizontal synchronizing circuit for synchronizing the timing of horizontal deflection operation with a horizontal synchronizing signal, which circuit comprises a horizontal AFC circuit including a variable frequency oscillator for generating a series of pulses having a frequency substantially higher than the horizontal frequency and equal to n times the horizontal frequency, wherein n is a natural number, a frequency dividing circuit for generating a series of pulses obtained by dividing the frequency of said first series of pulses by a plurality of different rates, and a first phase detecting circuit for comparing the phase of said series of pulses from the frequency dividing circuit, having a frequency equal to said horizontal frequency, with the phase of the horizontal synchronizing signal and generating a first phase difference signal corresponding to the phase difference, the oscillating frequency of said variable frequency oscillator being controlled by said first phase difference signal, and a horizontal APC circuit including a horizontal deflecting circuit for generating a horizontal flyback pulse, a second phase detecting circuit for comparing the phase of the series of pulses from said frequency dividing circuit, having a frequency equal to said horizontal frequency, with the phase of the horizontal flyback pulse and generating a second phase difference signal corresponding to the phase difference therebetween, a logic circuit for forming a pulse occurring at the middle of a pulse interval of said horizontal synchronizing pulse by the combination of a number of series of pulses produced from said frequency dividing circuit, a variable phase shifting circuit for shifting the phase of said pulse from said logic circuit by an amount corresponding to said second phase difference signal, and a control means for synchronizing the operation of said horizontal deflection circuit in accordance with the pulse produced from said phase shifting circuit.

2. A horizontal synchronizing circuit as defined in claim 1, wherein the first phase detecting circuit comprises a first AND gating means for generating a first pulse during a period in which both of the second series of pulses and the horizontal synchronizing pulse exist, a second AND gating means for generating a second pulse during a period in which both a pulse obtained by inverting the second series of pulses and the horizontal synchronizing pulse exist, and a first conversion circuit for converting the difference in width between the first and second pulses into a voltage and generating, as the first phase difference signal, the voltage difference.

3. A horizontal synchronizing circuit as defined in claim 1, wherein said frequency dividing circuit has a plurality of output terminals for providing pulses obtained by frequency-dividing the output from the variable frequency oscillator by different values.

4. A horizontal synchronizing circuit as defined in claim 3, wherein said second phase detecting circuit comprises a first pulse generating means for generating a control pulse of a frequency equal to the horizontal frequency in combination with the output from the frequency dividing circuit, a third AND gating means for generating a third pulse during a period in which both said control pulse and the horizontal flyback pulse exist, a fourth gating means for generating a fourth pulse during a period in which both the control pulse which has been inverted, and the horizontal flyback pulse appear, and a second conversion circuit for converting the difference in pulse width between the third and fourth pulses into a voltage and generating, as the second phase difference signal, the voltage difference.

5. A horizontal synchronizing circuit as defined in claim 3, further comprising a discriminating means for discriminating whether or not the horizontal flyback pulse is synchronized with the horizontal synchronizing signal.

6. A horizontal synchronizing circuit as defined in claim 5, further comprising a sixth AND gating means for generating a sixth pulse having a pulse width including the pulse period of the first pulse in combination with the output from the frequency dividing circuit, a seventh AND gating means for generating a seventh pulse having a pulse width including the pulse period of the second pulse in combination with the output from the frequency dividing circuit, an eighth AND gating means for deriving a logical product of the sixth pulse and the horizontal synchronizing signal when the discriminating means has discriminated the synchronized state and for supplying logical product as one input to the first gating means which also receives the first series of pulses as another input, and a ninth AND gating means for deriving a logical product of the seventh pulse and the horizontal synchronizing pulse when the discriminating means has discriminated the synchronized state and for supplying the logical product as one input to the second AND gating means which also receives, as another input, the second series of pulses which have been inverted.

7. A horizontal synchronizing circuit as defined in claim 5, further comprising a second pulse generating means for generating a gating pulse which steps down substantially simultaneously with the step-down of the positive horizontal synchronizing pulse in combination with the output from the frequency dividing circuit and steps up after the lapse of a predetermined time, and a tenth AND gating means for deriving a logical product of the gating pulse and the horizontal synchronizing pulse and for supplying the logical product as one input to the discriminating means which also receive the flyback pulse as another input.

8. A horizontal synchronizing circuit as defined in claim 1, wherein said variable phase shifting circuit comprises integration means for forming a sawtooth waveform signal for horizontal synchronization in a synchronized relation with said pulse from said logic circuit, and a comparing means for comparing levels between said sawtooth waveform signal and said second phase difference signal, said comparing means producing said pulse when the level of said sawtooth waveform signal exceeds the level of said second phase difference signal.

* * * * *